United States Patent [19]
Alberts et al.

[11] Patent Number: 4,463,127
[45] Date of Patent: Jul. 31, 1984

[54] CROSSLINKABLE GRAFT POLYMER DISPERSION OF ORGANOPOLYSILOXANES CONTAINING HYDROGEN-SILOXANE GROUPS AND SI-VINYL GROUPS

[75] Inventors: Heinrich Alberts, Cologne; Helmut Steinberger, Leverkusen, both of Fed. Rep. of Germany

[73] Assignee: Bayer Aktiengesellschaft, Leverkusen, Fed. Rep. of Germany

[21] Appl. No.: 454,893

[22] Filed: Dec. 30, 1982

[30] Foreign Application Priority Data

Jan. 16, 1982 [DE] Fed. Rep. of Germany ....... 3201194

[51] Int. Cl.$^3$ ........................................... C08F 283/12
[52] U.S. Cl. ..................................... 524/731; 528/24; 528/25; 528/26; 528/28
[58] Field of Search ....................... 528/24, 25, 26, 28; 524/588, 862, 731

[56] References Cited

U.S. PATENT DOCUMENTS

| | | | |
|---|---|---|---|
| 3,249,581 | 5/1966 | Nelson | 524/861 |
| 3,555,109 | 1/1971 | Getson | 528/25 |
| 3,580,971 | 5/1971 | Getson | 528/26 |
| 3,627,836 | 12/1971 | Getson | 528/26 |
| 4,014,851 | 3/1977 | Bluestein | 524/425 |
| 4,123,472 | 10/1978 | Getson | 528/26 |
| 4,166,078 | 8/1979 | Getson | 528/26 |
| 4,211,729 | 7/1980 | Marquardt et al. | 528/26 |

FOREIGN PATENT DOCUMENTS 0002744 7/1979 European Pat. Off. .
0004947 10/1979 European Pat. Off. .
7700475 12/1977 France .

OTHER PUBLICATIONS

Chemical Abstracts, vol. 95, No. 3, Aug. 1981, p. 31, No. 44122g, Columbus, Ohio.
Chemical Abstracts, vol. 94, No. 6, Mar. 1981, p. 74, No. 85490y, Columbus, Ohio.

*Primary Examiner*—C. Warren Ivy
*Attorney, Agent, or Firm*—Sprung, Horn, Kramer & Woods

[57] ABSTRACT

A graft copolymer dispersion is produced by polymerizing a mixture comprising by weight approximately
(a) 1 to 99% of an organopolysiloxane mass containing Si-H groups and vinyl groups, and
(b) 99 to 1% of a polymerizable vinyl monomer.

Polymerization initiators and/or molecular weight controllers may also be present. The product is not crosslinked as produced but can be blended with a crosslinking agent, applied to a textile as a coating and the crosslinked.

12 Claims, No Drawings

CROSSLINKABLE GRAFT POLYMER DISPERSION OF ORGANOPOLYSILOXANES CONTAINING HYDROGEN-SILOXANE GROUPS AND SI-VINYL GROUPS

The present invention relates to crosslinkable graft polymer dispersions of organopolysiloxanes which contain Si-H groups and Si-vinyl groups and which may contain further polydiorganosiloxanes and of vinyl monomers and to the aqueous dispersions obtainable from these graft polymer dispersions.

The graft modification of organopolysiloxanes with vinyl monomers is described, for example, in British Patent Specification No. 766,528, British Patent Specification No. 806,582, British Patent Specification No. 869,482 and German Auslegeschrift No. 1,694,973. Furthermore, it is known from U.S. Pat. No. 4,166,078 to modify Si-H-siloxanes by grafting with vinyl monomers. Moreover, U.S. Pat. No. 4,172,101 describes the graft modification of vinyl-substituted polysiloxanes.

Furthermore, W. Noll "Chemie und Technologie der Silicone (Chemistry and Technology of Silicones)"; Verlag Chemie, Weinheim, Bergstr. 2nd edition (1968), page 341, describes how the combination of Si-H-siloxanes with Si-vinylsiloxanes in the presence of free-radical formers leads to crosslinked products.

It has now been found, surprisingly, that uncrosslinked and, in some cases, low viscosity graft polymer dispersions are obtained in the free-radical polymerization of vinyl monomers in the presence of mixtures of Si-H-siloxanes and Si-vinylsiloxanes.

The present invention relates to graft polymer dispersions containing 1. as grafting substrate 1 to 99% by weight of organopolysiloxanes consisting of a mixture of
   A. organopolysiloxanes containing Si-H groups,
   B. organopolysiloxanes containing vinyl groups and, if appropriate,
   C. polydiorganosiloxanes
2. and as grafted-on polymer phase 99 to 1% by weight of polymerized units of vinyl monomers, the total amount of components 1 and 2 always being 100% by weight.

The invention also relates to graft polymer dispersions containing as 1. grafting substrate 1 to 99% by weight, preferably 24 to 76% by weight, of organopolysiloxane component consisting of a mixture of
   A. 1 to 99% by weight, preferably 5 to 85% by weight, of organopolysiloxanes containing Si-H groups,
   B. 99 to 1% by weight, preferably 95 to 15% by weight, of organopolysiloxanes containing vinyl groups and, if appropriate,
   C. 0 to 50% by weight, preferably 0 to 35% by weight, of polydiorganosiloxanes and
2. as grafted-on polymer phase 99 to 1% by weight, preferably 76 to 24% by weight, of polymerized units of vinyl monomers, the total amount of components 1 A-C and 1 and 2 being in each case 100% by weight.

The invention also relates to a process for preparing graft polymer dispersions, which is characterized in that
I. 1 to 98.999% by weight, preferably 15 to 79.9% by weight, of organopolysiloxane component containing
   A. 1 to 99% by weight, preferably 5 to 85% by weight, of organopolysiloxanes containing Si-H groups,
   B. 99 to 1% by weight, preferably 95 to 15% by weight, of organopolysiloxanes containing vinyl groups,
   C. 0 to 50% by weight, preferably 0 to 35% by weight, of polydiorganosiloxanes and
II. 98.999 to 1% by weight, preferably 83.5 to 20% by weight, of vinyl monomers, preferably n-butyl acrylate,
III. 0 to 10% by weight, preferably 0 to 2% by weight, of molecular weight controller and
IV. 0.001 to 10% by weight, preferably 0.1 to 1.5% by weight, of initiator are subjected to a polymerization reaction at reaction temperatures between −20° C. and 250° C., preferably 40° C. to 150° C., and under reaction pressures up to 500 bar, preferably up to 20 bar.

The invention also relates to aqueous dispersions obtainable from the graft polymer dispersions.

The invention also relates to crosslinked compositions obtained from the dispersions according to the invention, if appropriate with the addition of fillers, hardening catalysts and, if appropriate, additional crosslinking agents.

The organopolysiloxanes used are

A. polymethylhydrogensiloxanes of the general formula

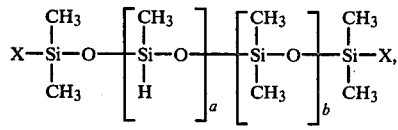

wherein
a denotes an integer between 0 and 120,
b denotes an integer between 0 and 140 and
X denotes a methyl group or hydrogen;

B. polysiloxanes containing vinyl groups and of the formula

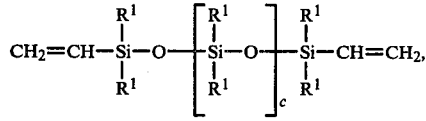

wherein
$R^1$ is so chosen from alkyl radicals having 1 to 24 carbon atoms, aryl radicals, vinyl radicals and fluoroalkyl radicals having 1 to 24 carbon atoms that the polymer contains 0.0002 to 3% by weight of vinyl groups and
c has a value which is such that the viscosity of the polymer varies between 100 and 1,000,000 mPa at 25° C.; and C. polydiorganosiloxanes of the formula

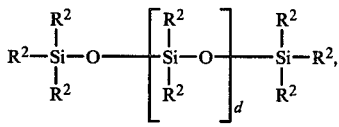

wherein
$R^2$ is chosen from among alkyl radicals having 1 to 32 carbon atoms and aryl radicals and d has a value which is such that the viscosity of the polymer varies between 1 and 1,000,000 mPa at 25° C.

Examples which may be mentioned of vinyl monomers are olefins, such as ethylene, propylene and isobutylene, vinyl esters of aliphatic or aromatic carboxylic acids, preferably vinyl acetate and vinyl propionate, and α,β-unsaturated monocarboxylic or dicarboxylic acids and their derivatives; the following may be mentioned: (meth)acrylic acid, methyl (meth)acrylate, ethyl (meth)acrylate, propyl or isopropyl (meth)acrylate, n-butyl, isobutyl or tert.-butyl (meth)acrylate, 2-ethylhexyl (meth)acrylate, (meth)acrylamide derivatives, (meth)acrylonitrile, maleic anhydride, maleinamide, N-alkyl-maleinamides and -maleinimides, half-esters or diesters of maleic acid, vinyl aromatics, such as styrene, α-methylstyrene, 4-chlorostyrene, vinyl chloride, vinylidene chloride, vinylidene fluoride, tetrafluoroethylene, perfluoropropylene, perfluoroalkyl group-containing (meth)acrylic acid esters, amides and sulphonamides of the general formula

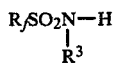

in which $R_f$ represents a perfluoroalkyl radical having 1 to 24 C atoms and $R_3$ represents the (meth)acrylic acid radical, and vinyl ethers, such as ethyl vinyl ether and n-butyl vinyl ether; the following may be mentioned from the series of the allyl compounds: allyl alcohol, allyl acetate, isobutene diacetate, 2-methylenepropane-1,3-diol, allylethyl carbonate and allylphenyl carbonate.

If it is desired to crosslink the vinyl resin phase or to increase the molecular weights thereof, divinyl compounds or diallyl compounds can be used. Examples which may be mentioned are divinylbenzene, divinyl adipate, (meth)acrylates of polyhydric alcohols, such as, for example, ethylene glycol dimethacrylate, diethylene glycol diacrylate and divinyl ether, also diallyl ether, diallyl carbonates or diallyl esters, and also triallyl cyanurate and triallyl citrate.

The invention also relates to a process for preparing aqueous dispersions or emulsions of crosslinkable co-graft polymers according to the invention.

The graft polymers are prepared by subjecting mixtures of polysiloxanes containing Si-H groups and vinyl groups, if appropriate further organopolysiloxanes and vinyl monomers to a free-radical polymerization. Stable graft polymer dispersions are obtained which contain the organopolysiloxanes and polymerized units of one or more vinyl monomers and which are characterized in that they contain organopolysiloxane graft polymers crosslinked via polymerized units of the vinyl monomers used.

In the course of the free-radical grafting reaction, not only polymerization and grafting polymerization of the vinyl monomers takes place but also a mono-addition of the vinyl monomers to the Si-H function of the methyl-H-siloxanes, approximately according to the following equation:

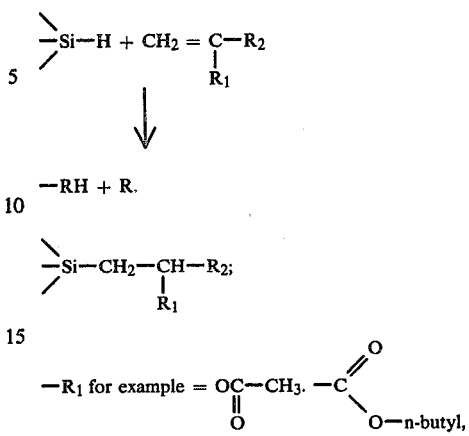

This mono-addition alters the polarity and the hydrophobic character of the polysiloxane chain and the interaction with a textile substrate is improved.

The free-radical polymerization of vinyl monomers can be started in a way which is in itself known with the aid of free-radical formers, UV radiation or α-, β- or γ-rays or thermally without further additives. The radiation-initiated polymerization is preferably carried out in the presence of sensitizers, compare, for example, A. D. Jenkins and A. Ledwith, Reactivity, Mechanism and Structure in Polymer Chemistry, John Wiley and Son, London, New York, 1974, page 465.

To start the free-radical polymerization of the vinyl monomers, free-radical formers are used in amounts between 0.001 to 10, preferably 0.1 to 1.5, % by weight, relative to the total mixture of organopolysiloxanes and vinyl monomers. Examples which may be mentioned of free-radical formers are azo initiators, such as azobisisobutyronitrile (AIBN), azo esters, azo-imino esters or azo-N-alkylamides, peroxides, such as di-tert.-butyl peroxide, dicumyl peroxide, dibenzoyl peroxide or 2,4-dichlorobenzyl peroxide, peresters, such as amyl perpivalate, tert.-butyl perpivalate, tert.-butyl peroctoate, t-butyl perbenzoate or tert.-butyl perneodecanoate, percarbonates, such as cyclohexyl percarbonate or bis-isopropyl percarbonate, or hydroperoxides, such as, for example, cumyl hydroperoxide or tert.-butyl hydroperoxide.

Other suitable initiators or benzopinacol, benzopinacol derivatives or other thermally labile highly substituted ethane derivatives.

The polymerization can also be started with the aid of redox systems at temperatures which are lower than the purely thermal decomposition temperatures of free-radical formers.

Examples which may be mentioned of redox initiators are combinations of peroxides and amines, such as, for example, benzoyl peroxide and triethylamine, trialkylboron compounds and oxygen, hydroperoxides and sulphinic acids, formaldehyde or aldoses or combinations with low-valent transition metal salts and sulphur dioxide/peroxide redox systems.

The polymerization reaction can be carried out continuously or discontinuously, unpressurized or under reaction pressures up to, for example, 500 bar, preferably up to 20 bar, at reaction temperatures between −20° C. and +250° C., preferably 40° to 150° C. If desired, the polymerization can also be carried out in the presence of solvents or diluents, of which mention may be made of water, alcohols, such as methanol, ethanol or tert.-butanol, aliphatic or aromatic hydrocarbons, halogenated hydrocarbons, such as chlorobenzene or fluorinated compounds, ethers, such as dioxane or tetrahydrofuran, and esters, such as, for example, ethyl acetate. However, preferably the polymerization is carried out without solvent.

If desired, the polymerization reaction can be carried out in the presence of molecular weight regulators. Regulators which may be mentioned are mercaptans, such as n- or tert.-dodecylmercaptan, thioglycol, thioglycerol or thioacetates. Further, sulphur-free molecular weight regulators, such as hydrocarbons, of which may be mentioned by way of example paraffin compounds, such as, for example, petroleum ether, light or cleaner's naphtha, α-olefins having up to 32 C atoms, such as, for example, propylene, isobutylene, 1-butene or diisobutylene, also ketones, such as, for example, acetone, methyl ethyl ketone or cyclohexanone, also aldehydes, such as, for example, formaldehyde, acetaldehyde, propionaldehyde or isobutyraldehyde, or allyl compounds, such as, for example, allyl alcohol, allyl acetate, isobutene diacetate or allyl carbonates.

Other suitable molecular weight regulators for the process according to the invention are enol ethers which are derived, on the one hand, from aliphatic or cycloaliphatic aldehydes or ketones and, on the other hand, from alkyl, cycloalkyl or aralkyl alcohols. The cycloaliphatic aldehydes or ketones can be ring-substituted or bridged and/or contain a double bond. Examples which may be mentioned are butyraldehyde, valeraldehyde, cyclohexylaldehyde, cyclohexenylaldehyde, bicyclo[2.2.1]hexenylaldehyde and cyclohexanone. Those cycloaliphatic aldehydes or ketones are preferable which are optionally ring-substituted by one or two $C_1$–$C_5$-alkyl groups, in particular by methyl groups.

Suitable alcohols are $C_1$–$C_{20}$-alkanols which can optionally be branched or unsaturated and $C_5$–$C_{10}$-cycloalkanols and $C_7$–$C_{20}$-aralkyl alcohols, the cycloalkyl or aryl group of which can optionally be substituted by lower alkyl radicals. Examples which may be mentioned are methanol, ethanol, n-propanol, isobutanol, 2-ethylhexanol, cyclohexanol and benzyl alcohol.

The preparation of enol ethers is extensively described in the literature, for example in Houben-Weyl, Methoden der Organischen Chemie (Methods of Organic Chemistry), Volume VI/3, page 90, Georg Thieme Verlag, Stuttgart, 1965.

Enol ethers used as molecular weight regulators are used in amounts of 0.01–10% by weight, preferably of 0.05–1% by weight, relative to the total amount of the monomers. The enol ethers can be added during the polymerization at any time, but preferably the enol ether used as regulator is added at the start of the polymerization.

Possible telogens are also halogenated hydrocarbons, such as methylene chloride, tetrachloroethane, dibromoethane and the like. As expected, the viscosities of the dispersions can be controlled with the aid of regulators of this type.

The graft polymerization dispersions are prepared by raising mixtures of a terminally vinyl-functional organopolysiloxane, a methyl hydrogen polysiloxane and one or more vinyl monomers in the presence of a free-radical former to a reaction temperature which initiates the polymerization. If desired, mixtures of terminally vinyl-functional and non-functional organopolysiloxanes can also be added to the reaction mixture. The polymerization can be carried out continuously or discontinuously. The order in which the components to be reacted are added is in principle optional, but the best results are obtained when mixtures of vinyl-siloxane and hydrogen siloxane and vinyl monomers are simultaneously used when carrying out the polymerization reaction. The degree of conversion of the monomers used depends on the polymerization process chosen and on the reaction conditions. In the discontinuous polymerization method, the highest possible conversions are aimed at, so that at least 80% of the monomers used, but preferably more than 90%, are converted.

Residual monomers are removed by known methods using distillation under atmospheric pressure or under reduced pressure. The residual monomer contents actually still found in the dispersions after working up are negligibly low, being in general below 1,000 ppm, preferably below 100 ppm.

The silicone/vinyl monomer dispersions obtained according to the invention are water repellents and suitable for coating and finishing systems for natural or synthetic leathers as well as for natural or synthetic fibers, filaments or textile sheet structures and they are also suitable for use as flow and processing auxiliaries for various applications in the plastics and paints field. They are also suitable for use as a constituent of elastomer systems.

Use of the materials of the dispersions for coating and finishing systems for textiles is the subject matter of application Ser. No. 454,829, filed Dec. 30, 1982, now pending.

When the graft dispersions according to the invention are used as coating agents for, for example, textile substrates or leather or synthetic leather crosslinking can be effected catalytically or thermally. When using platinum or platinum compounds in the crosslinking step it is advisable to use appropriate inhibitors, such as, for example, acetylene alcohols, in particular methylenetinol.

Crosslinking can also be effected with the aid of free-radical formers or by UV radiation.

When the graft dispersions are used in elastomer systems, customary fillers, auxiliaries and, if appropriate, pigments can be added.

The silicone/vinyl polymer dispersions obtained according to the invention have, compared to pure silicones of corresponding viscosity, a comparatively more favorable emulsifying behaviour.

They are relatively readily convertible with the aid of known emulsifiers and emulsifying techniques into stable emulsions.

The emulsifiers used advantageously consist of a mixture of a hydrophilic and a hydrophobic component. Examples of suitable compounds are fatty acid esters of polyhydric alcohols, such as, for example, stearates of glycols, glycerol or sorbitol, and higher fatty alcohols or the addition products of ethylene oxide to these fatty alcohols, fatty acids or similar compounds having an active hydrogen atom. However, anionic emulsifiers, such as sodium lauryl-sulphate or sodium dodecylbenzenesulphonate or alkyl, aryl or alkylaryl carboxylates, or also cationic emulsifiers, such as quaternary ammonium compounds, are also suitable.

The examples which follow are intended to illustrate the invention in more detail without restricting it in its scope.

Unless otherwise stated, quantitative data are understood as being parts by weight or percentages by weight.

PREPARATION OF THE STARTING SUBSTANCES

The polydiorganosiloxanes are prepared in a way which is in itself known (compare W. Noll, "Chemie und Technologie der Silicone (Chemistry and Technology of Silicones)", Verlag Chemie, Weinheim/Bergstrasse, 2nd edition, 1968, chapter 5, page 162 et seq.).

The siloxanes mentioned in the examples are characterized as follows:

| Polysiloxane | Description | Viscosity mPa [25° C.] |
|---|---|---|
| A | terminated by trimethylsilyl groups | 1,000 |
| B | contains vinyl groups not only terminally but also in the chain | 10,000 |
| C | Si—H—containing, terminated by trimethylsilyl groups | 20 |
| D | Si—H—containing, terminated by trimethylsilyl groups | 800 |

EXAMPLE 1

10.5 kg of a polysiloxane B and 9 kg of a polysiloxane C are initially introduced into a 40 liter autoclave equipped with a reflux condenser and heated to 110° C. while nitrogen is being passed over. 2 solutions are then simultaneously added in the course of 5 hours:

| Solution 1 | 7.5 kg of n-butyl acrylate |
|---|---|
| Solution 2 | 1.5 kg of polysiloxane C and 45 kg of t-butyl perpivalate |

The batch is stirred for 1 hour and the volatile constituents are then removed by distillation.
Viscosity at 25° C.: 12,000 mPa.
Composition:
37% of units of polysiloxane B
37% of units of polysiloxane C
26% of polymerized units of n-butyl acrylate

EXAMPLE 2

In a 6 liter stirred vessel, 1,500 g of polysiloxane B, 750 g of polysiloxane D, 750 g of polysiloxane C and 1 g of tetrahydrobenzaldehyde-enol ether are heated under an atmosphere of nitrogen to 150° C. Two solutions are then added simultaneously in the course of 4 hours.

| Solution 1 | 1,000 g of n-butyl acrylate |
|---|---|
| Solution 2 | 500 g of polysiloxane C |
| | 10 g of tert.-butyl peroctoate |
| | 4 g of tetrahydrobenzaldehydebenzyl-enol ether. |

The batch is stirred for 1 hour at 150° C., then evacuated and freed virtually completely from unconverted monomers. The graft polymer obtained has a viscosity of 1,500 mPa at 25° C. and a composition which corresponds to an 88% conversion of monomer.

EXAMPLE 3

3 kg of polysiloxane B and 150 g of polysiloxane C are heated to 110° C. in a 6 liter stirred vessel under a protective gas atmosphere. A solution of 1.75 kg of n-butyl acrylate, 15 g of tetrahydrobenzaldehydebenzyl-enol ether and 7.5 g of t-butyl perpivalate is then pumped in in the course of 5 hours. The batch is stirred for 1 hour and the volatile constituents are removed in vacuo. The final product has a viscosity of 40 Pa at 25° C. and the following composition:
28% of polymerized units of butyl acrylate
3% of units of polysiloxane C and
69% of units of polysiloxane B.

EXAMPLES 4 AND 5

The components indicated under "initially introduced" are introduced into a 6 liter stirred vessel under an atmosphere of nitrogen and heated to 110° C. The monomer-initiator solution is added in the course of 3 hours, and the batch is then stirred for 1 hour. After the volatile constituents have been removed in vacuo, the batch is cooled down.

| Example | Initially introduced Polysiloxane B | Initially introduced Polysiloxane C | Solution n-Butyl acrylate | Hydroxyester | Acrylamide | t-Butyl perpivalate | Amount of distillate | Viscosity at 25° C. in mPa |
|---|---|---|---|---|---|---|---|---|
| 4 | 1250 | 1250 | 1960 | 40 | — | 12 g | 7 g | 61,000 |
| 5 | 1250 | 1250 | 1960 | — | 40 | 12 g | 59 g | 90,000 |

EXAMPLE 6

900 g of polysiloxane C and 600 g of polysiloxane B, 2.5 g of di-tert.-butyl peroxide and 450 g of vinylidene fluoride are initially introduced into a 6 steel autoclave. The batch is heated to 125° C. and stirred for 30 minutes at 125° C. Solution 1 and 2 are then added in the course of 3 hours.

| Solution 1 | 250 g of polysiloxane C and 12.5 g of di-tert.-butyl peroxide |
|---|---|
| Solution 2 | 1,300 g of vinylidene fluoride. |

The batch is stirred for 1 hour at 125° C., carefully let down and evacuated. The volatile constituents are removed. The graft polymer contains 45% by weight of polymerized units of vinylidene fluoride, 22% by weight of units of polysiloxane B and 33% by weight of units of polysiloxane C.

EXAMPLE 7

1.4 kg of an oleyl alcohol reacted with 50 mols of ethylene oxide and 1.2 kg of a tridecyl alcohol reacted with 6 mols of ethylene oxide are added with stirring to 40.0 kg of the graft copolymer dispersion of Example 1.

The mixture is heated to 60° C., and 57.4 kg of deionized water are incorporated with stirring. A homogeneous and stable emulsion of the graft copolymer is obtained. If necessary, the emulsion can be homogenized to obtain a more finely divided state, by means of a high pressure homogenizing machine (for example Alfa-Laval, SH 20 type) in one or more passes under 200 bar.

EXAMPLES 8 TO 12

The same procedure as illustrated in Example 7 leads to emulsions of copolymers in the following compositions:

| Example No. | Graft polymer of Example | % by weight | Emulsifier | High pressure homogenization |
|---|---|---|---|---|
| 8 | 2 | 40 | 1.5% of oleyl 50-ethoxylate | — |
| 9 | 3 | 40 | 1.5% of oleyl 50-ethoxylate | — |
| 10 | 4 | 35 | 1.4% of sorbitan trioleate 1.2% of oleyl 50-ethoxylate | twice 200 bar |
| 11 | 5 | 45 | 1.0% of sorbitan trioleate | once 200 bar |
| 12 | 6 | 30 | 1.5% of oleyl 50-trioleate 1.5% of decenol 4-ethoxylate | twice 200 bar |

It will be understood that the specification and examples are illustrative but not limitative of the present invention and that other embodiments within the spirit and scope of the invention will suggest themselves to those skilled in the art.

We claim:

1. A process for producing a stable graft polymer dispersion comprising polymerizing a mixture comprising by weight approximately
   (a) 1 to 99% of an organopolysiloxane mass containing Si-H groups and Si-vinyl groups, and
   (b) 99 to 1% of a polymerizable vinyl monomer.

2. A process according to claim 1, wherein each of (a) and (b) is present in about 24 to 76% of (a) plus (b).

3. A process according to claim 2, wherein (a) comprises at least two different organopolysiloxanes, one of them containing Si-H groups and comprising about 5 to 85% of (a) and another containing Si-vinyl groups and comprising about 95 to 15% of (a).

4. A process according to claim 3, wherein (a) includes a third organopolysiloxane present in up to about 50% of (a).

5. A process according to claim 1, wherein the mixture further contains 0.001 to 10% of a polymerization initiator based on the weight of initiator plus (a) plus (b).

6. A process according to claim 1, wherein the mixture further contains up to about 10% of a molecular weight controller based on the weight of controller plus (a) plus (b).

7. A process according to claim 3, wherein each of (a) and (b) is present in about 24 to 76% of (a) plus (b), (a) includes a third polysiloxane present in up to about 35% of (a) and the mixture further contains up to about 2% of a molecular weight controller and about 0.1 to 1.5% of a polymerization initiator based on the weight of controller plus initiator plus (a) plus (b).

8. The product produced by the process of claim 1.

9. The product produced by the process of claim 7.

10. The product produced by crosslinking a dispersion produced by the process of claim 1.

11. A process for producing a stable graft polymer dispersion comprising polymerizing in the presence of a free radical initiator a mixture comprising
    (a) 1 to 99% of a mixture of at least two different organopolysiloxanes, and
    (b) 99 to 1% of a polymerizable vinyl monomer selected from the group consisting of an olefin, a vinyl ester of an aliphatic or aromatic acid, an $\alpha,\beta$-unsaturated monocarboxylic or dicarboxylic acid or an ester, amide, nitrile, anhydride or fluoro-substitution product thereof, a vinyl aromatic, vinyl chloride, vinylidene chloride, vinylidene fluoride, tetrafluoroethylene, perfluoropropylene, an N-alkenoyl-perfluorosulphonamide, a vinyl ether, allyl alcohol, allyl acetate, isobutene diacetate, 2-methylenepropene-1,3-diol, allylethyl carbonate and allylphenyl carbonate,
    (c) being made up of about 5 to 85% of an Si-H containing polymethylhydrogensiloxane of the formula

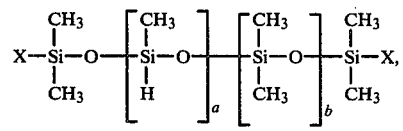

wherein
a denotes an integer between 0 and 120,
b denotes an integer between 0 and 140 and
X denotes a methyl group or hydrogen,
   and about 95 to 15% of an Si-vinyl containing polysiloxane of the formula

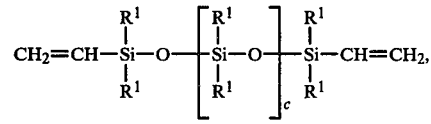

wherein
$R^1$ is so chosen from alkyl radicals having 1 to 24 carbon atoms, aryl radicals, vinyl radicals and fluoroalkyl radicals having 1 to 24 carbon atoms that the polymer contains 0.0002 to 3% by weight of vinyl groups and
c has a value which is such that the viscosity of the polymer varies between 100 and 1,000,000 mPa at 25° C.

12. The product produced by the process of claim 11.

* * * * *